Figure 1:
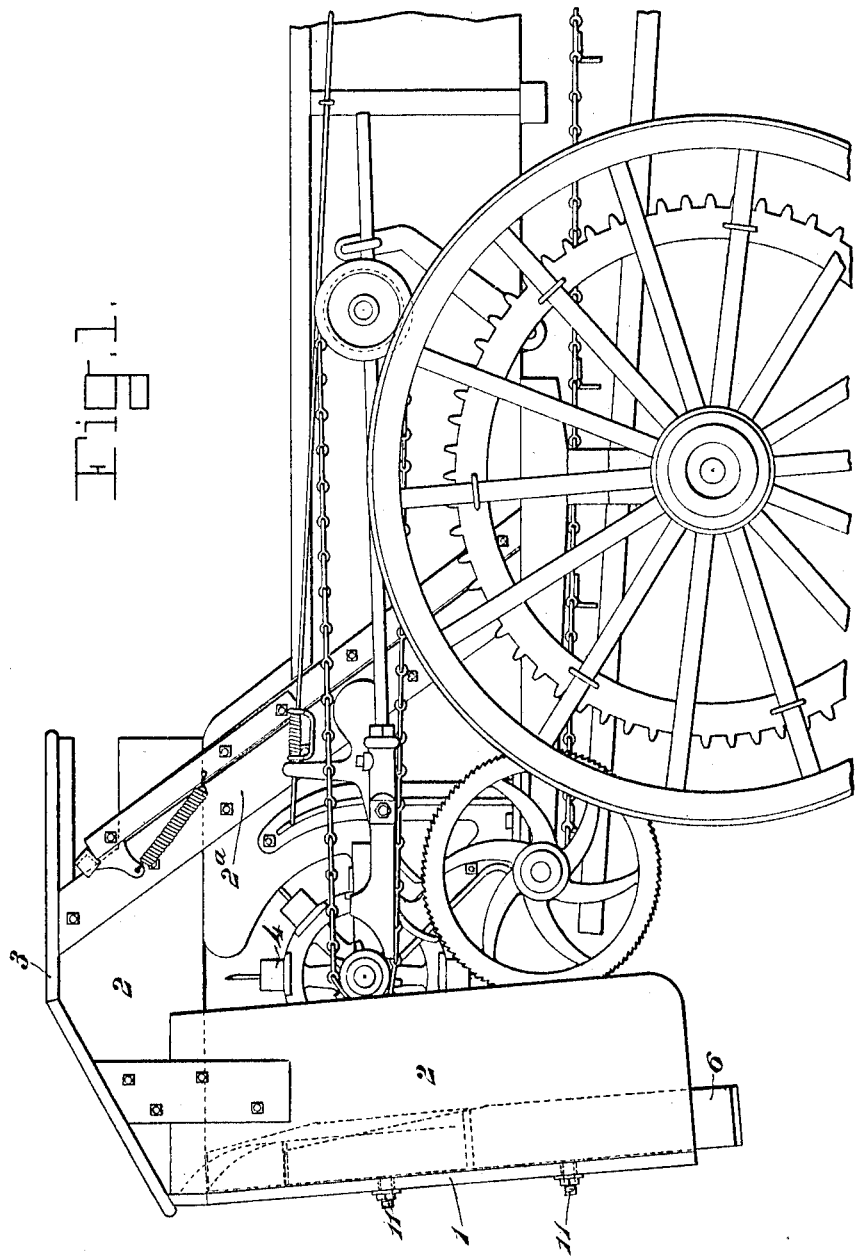

C. H. ELLIS.
DRILL ATTACHMENT FOR MANURE SPREADERS.
APPLICATION FILED JULY 9, 1909.

949,173.

Patented Feb. 15, 1910.
2 SHEETS—SHEET 1.

WITNESSES
Harry King
Joseph C. Stack.

INVENTOR
C. H. Ellis
By Julian C. Dowell
Attorneys

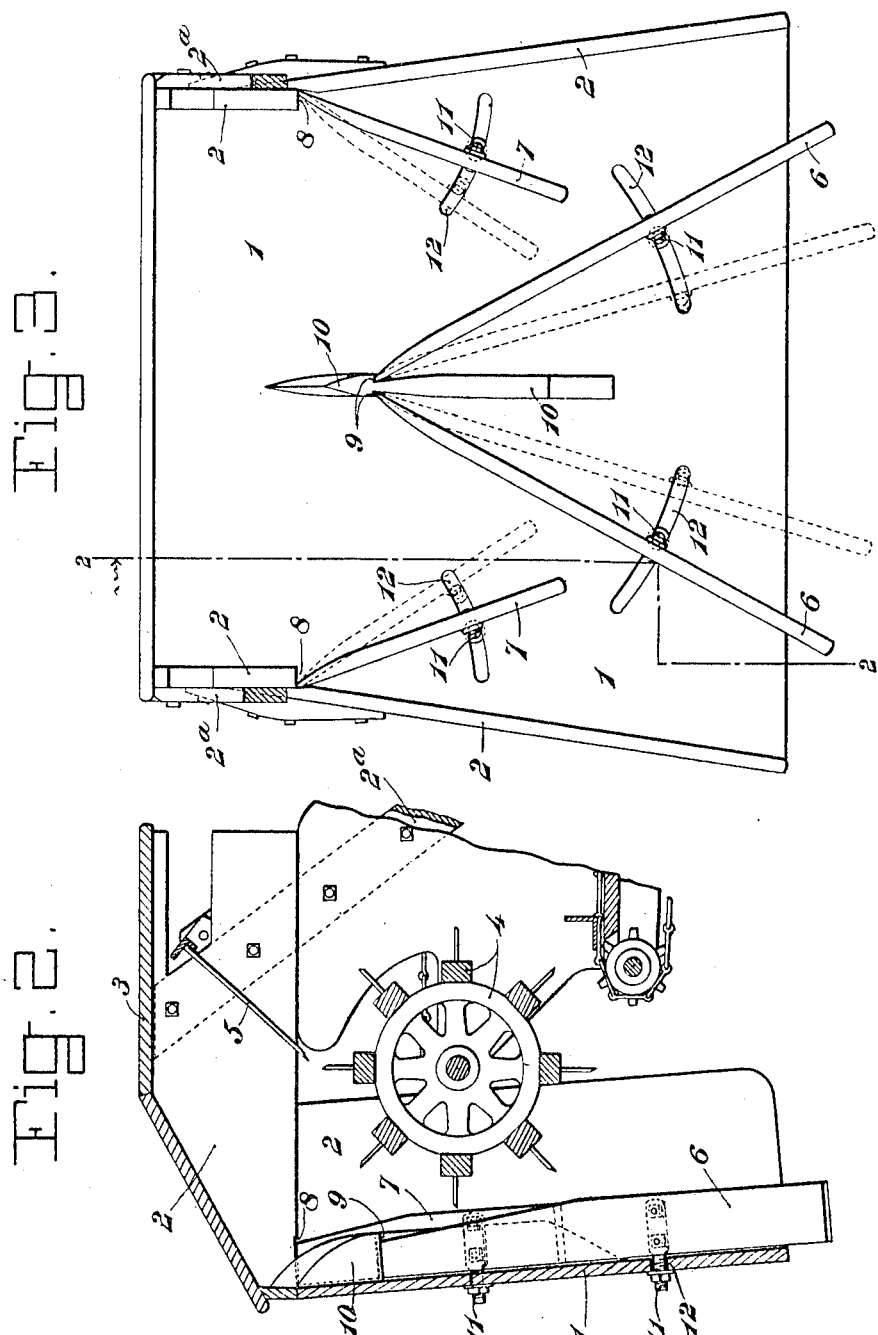

UNITED STATES PATENT OFFICE.

CHARLES H. ELLIS, OF HARTSVILLE, SOUTH CAROLINA.

DRILL ATTACHMENT FOR MANURE-SPREADERS.

949,173. Specification of Letters Patent. Patented Feb. 15, 1910.

Application filed July 9, 1909. Serial No. 506,815.

*To all whom it may concern:*

Be it known that I, CHARLES H. ELLIS, a citizen of the United States, residing at Hartsville, in the county of Darlington and State of South Carolina, have invented certain new and useful Improvements in Drill Attachments for Manure-Spreaders; and I do hereby declare the following to be a full, clear, and exact description of the invention, such as will enable others skilled in the art to which it appertains to make and use the same.

One object of this invention is to provide an improved drill attachment for manure spreaders which can be readily and expeditiously adjusted to distribute the fertilizer in drills or rows that are near together or more widely separated.

Another object is to provide a simplified and inexpensive drill attachment having but few parts.

The invention will first be described with reference to the accompanying drawings and then more particularly pointed out in the appended claims.

Referring to the drawings: Figure 1 is a side elevation showing a drill attachment, embodying the invention, attached to a manure spreader. Fig. 2 is a vertical section of the drill attachment shown secured to a manure spreader, the plane of the section being indicated by the line 2—2 of Fig. 3. Fig. 3 is an elevation of the interior of the drill attachment viewed from the front, the deflectors being shown in one position in full lines, and adjusted to another position in dotted lines.

The frame of the drill attachment illustrated forms a hood-like structure approximately L-shaped in vertical section and having a rear 1 flaring sidewise toward the bottom, sides 2, and a top 3. The attachment is or may be secured to the wagon or spreader by means of bars 2ª which are fastened to the attachment and to the wagon.

The spreader, to which the invention is shown applied, is equipped with a beater or breaker-drum 4, a coöperating rake 5, suitable means for actuating the drum 4, and means for conveying the manure rearwardly in the wagon to the drum 4. In its application to this type of spreader, the top of the drill attachment overhangs the beater-drum 4, and the vertical sides 2 partly inclose it, while the sides 2 of the top are formed with openings to accommodate the head or bar of the rake 5.

Upon the rear 1 of the attachment, and to the rear of the beater-drum 4, are mounted, in pairs, adjustable deflectors or wings 6 and 7, the deflectors 7 being the outer ones, and said deflectors terminating above the lower ends of the deflectors 6. The deflectors have a pivoted or hinge-like movement in a vertical plane whereby the streams of fertilizer can be deposited along the ground nearer to or farther apart from each other. The pivotal mounting of the deflectors is of simple design and constitutes a feature of the invention. Instead of using pivot bolts or special castings to hinge the deflectors to the frame, the upper, and preferably beveled, end of each deflector seats in an angle, recess or socket. This socket, for the deflectors 7, can be formed as at 8 by the sides 2 of the rear overlapping the sides of the top; and for the deflectors 6, the pivot-sockets may be provided by forming angular notches 9 in the sides of a bar 10 having preferably a beveled top and fastened to the rear 1, approximately central thereof. Each deflector has secured to it a bolt 11 which projects rearwardly through a curved slot 12 having the respective pivot-socket as its approximate center. The deflectors are held in their adjusted positions by means of nuts which are on the bolts 12, and are adapted to bind against the rear of the attachment. The deflectors 6 and 7 are thus adjustable from the exterior; and as the longer deflectors 6 preferably extend below the rear 1, the adjustment of the deflectors to distribute the fertilizer in accordance with any spacing of rows can be readily and easily accomplished by simply loosening the nuts, adjusting the deflectors to the desired extent, and then tightening the nuts.

In the use of the invention, the manure taken up by the beater drum 4 is carried over against the rear 1 of the attachment where it is divided into two drills by the pairs of deflectors. Owing to the length of the deflectors 6 the fertilizer can be distributed to rows which vary considerably in their spacing. And as the deflectors 7 terminate well above the ends of the deflectors 6, the former while being of sufficient length to direct the fertilizer to the latter offer no hindrance to their adjustment.

By eliminating pivot bolts or hinges from the deflectors, their construction and assembling is rendered exceedingly simple; for with the exception of the adjusting bolts and nuts the parts may be otherwise of wood.

It will be noted that the back of the drill attachment is made to lean toward the wagon at the bottom about four inches or more in a full size apparatus, which greatly adds to its efficiency by preventing any of the material from falling clear of the drill between the rows; in which respect the present device is an improvement over prior drill attachments.

Having described my invention, what I claim is:

1. In a machine of the character described, the combination of a frame, and deflectors pivotally mounted thereon, the pivotal mounting of a deflector comprising a socket formed by the structure of the frame in which socket an end of the deflector is seated.

2. In a machine of the character described, the combination of a frame, deflectors pivotally mounted upon the rear of the frame, the deflectors being arranged in pairs at opposite sides of the center, the pivotal mounting of the deflectors consisting of recesses formed upon the frame in which recesses the upper ends of the deflectors are seated, bolts fast to the deflectors, the bolts projecting through slots formed in the rear of the frame and curved from the respective sockets as approximate centers, and nuts upon the bolts for holding the deflectors in position after adjustment.

3. In a machine of the character described, the combination of a frame provided with a rear and sides, the latter formed of overlapping members, and a bar secured to the rear approximately central thereof, the bar being provided with opposite recesses, and deflectors arranged in pairs, the upper ends of the outer deflectors being seated in the angles formed by the overlapping side members, and the upper ends of the inner deflectors being seated in the recesses of said bar, and means for holding the deflectors in said angles and recesses and for securing the deflectors after adjustment about said angles and recesses as centers.

In testimony whereof I affix my signature, in presence of two witnesses.

CHARLES H. ELLIS.

Witnesses:
  Geo. A. Jepom,
  S. M. Woodham.